J. WOOD.
ATTACHMENT FOR SELF PROPELLED VEHICLES.
APPLICATION FILED FEB. 3, 1908.
919,990.
Patented Apr. 27, 1909.
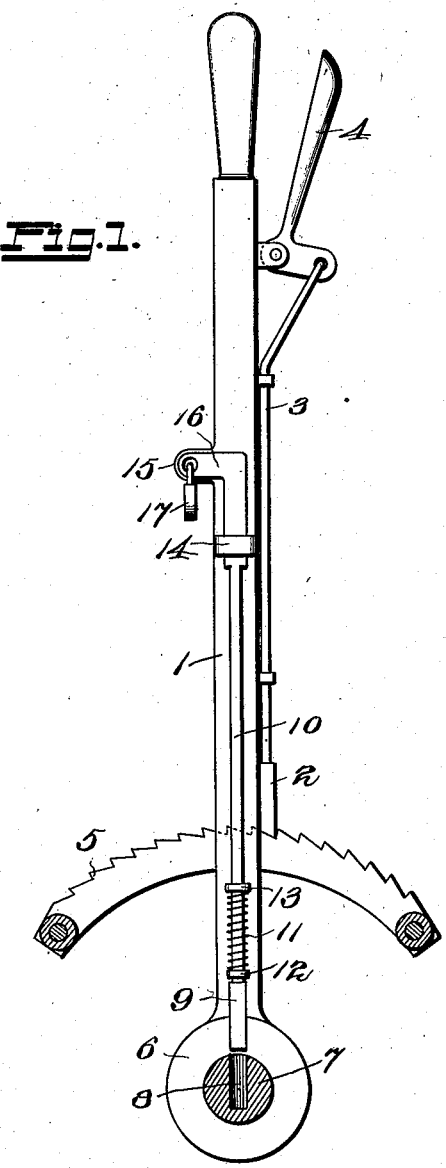
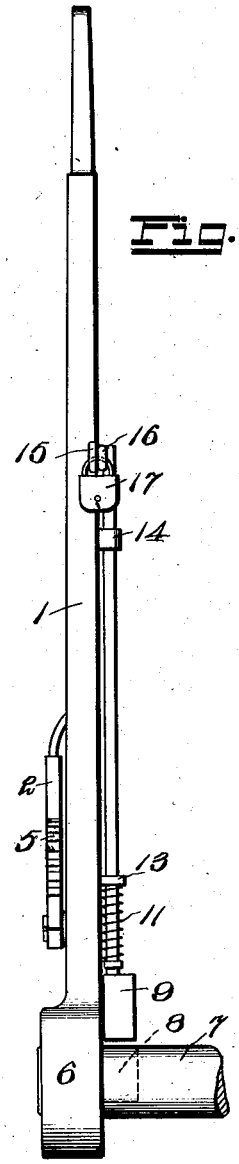
Fig. 1.
Fig. 2.
Witnesses
Inventor
John Wood
his Attorneys

UNITED STATES PATENT OFFICE.

JOHN WOOD, OF GRAND ISLAND, NEBRASKA.

ATTACHMENT FOR SELF-PROPELLED VEHICLES.

No. 919,990.

Specification of Letters Patent.

Patented April 27, 1909.

Application filed February 3, 1908. Serial No. 414,118.

*To all whom it may concern:*

Be it known that I, JOHN WOOD, a citizen of the United States, residing at Grand Island, in the county of Hall and State of Nebraska, have invented certain new and useful Improvements in Attachments for Self-Propelled Vehicles; and I do hereby declare the following to be a full, clear, and exact description of the invention, such as will enable others skilled in the art to which it appertains to make and use the same.

This invention relates to improvements in attachments for self-propelled vehicles.

The object of the invention is to provide means for breaking the interlock between the operating lever for throwing the transmission gear into and out of operative relation.

Specifically the invention consists in providing an operating lever so associated with the connecting means between it and the transmission gear that said lever may be locked to said connecting means and movable therewith, or unlocked from said connecting means and movable independently thereof, in which latter position the transmission gear may not be operated by an intermeddler.

While the invention is not restricted to the exact details as shown and described, still for the purpose of disclosure reference is had to the accompanying drawings illustrating a practical embodiment of the invention, in which drawings like numerals designate the same parts in the two views, and in which—

Figure 1 is a side elevation of an operating lever for a self-propelled vehicle showing my invention applied, and showing in section the connecting means or shaft between the operating lever and transmission gear, and Fig. 2 is a front elevation of the same.

1 designates the usual operating lever provided with the pawl 2, pawl rod 3 and grip 4, the pawl 2 coöperating with a suitable rack bar 5. This operating lever is enlarged at its lower end, as at 6, and receives the rock shaft 7 forming a connection between said lever and the transmission gear of the vehicle. The lever is so associated with said shaft that it may freely pivot thereon when unlocked therefrom, and while not shown, suitable keying means may be provided to prevent the lever from side play on the shaft, but allowing it to freely rotate thereon when unlocked. The shaft 7 is provided with a slot 8, which slot coöperates with a locking member 9 carried by a rod 10 mounted on the side of the lever 1. This rod 10 may be operated upwardly against the tension of a spring 11 coiled around said rod and disposed between the shoulder 12 on said rod and the guiding support 13 on the lever 1.

14 designates another guide member on the lever 1, and 15 designates a lateral projection apertured and adapted to coöperate with a similarly apertured lateral projection 16 carried by the upper end of the rod 10, said lateral projections extending in the same direction and the apertures therein being adapted to aline when the rod 10 is elevated, in which position any suitable locking means, such as a padlock 17, may be passed through said apertures to hold the rod 10 in its upper position.

It will be obvious that the rod 10 need not necessarily be located adjacent the lever 1, for if desired, for instance, the lever may be provided with a longitudinal slot receiving the rod 1, or the lever may be longitudinally bored and provided with a slot at the upper end of the bore to allow the lateral projection 16 to operate therein.

The operation of the device is apparent, it being observed that when the locking means 9 is in the elevated position shown with the padlock in position, the lever 1, if moved at all, will move independently of the rod 7, and hence will not affect the transmission gear. On the other hand, when the rod 10 is released and the locking member 9 is forced down into the recess 8 the rod 7 becomes interlocked with the lever and will be operated thereby upon the movement of the latter to throw the transmission mechanism in or out of operative position. Thus it will be seen that I provide a simple means for effectively preventing an intermeddler moving the vehicle through the use of its own propelling power, avoiding theft or other misuse.

What I claim is:—

1. In an attachment for self-propelled vehicles, the combination of a transmission shaft, an operating lever therefor having a perforated head loosely mounted on said shaft, means carried by said lever for normally locking said lever and said shaft together so that the movement of the lever will move said shaft, said lever and said means being provided with perforated extensions, and means for locking said extensions together in an inoperative position, substantially as described.

2. In an attachment for self-propelled vehicles, the combination of a transmission shaft, an operating lever therefor having a perforated head loosely engaging said shaft, spring pressed means carried by said lever for normally locking said lever and said shaft together, said means and said lever being provided with perforated extensions, means for locking said extensions together in an inoperative position, a curved rack and a sliding pawl pivotally mounted on said lever and adapted to engage said rack, substantially as described.

In testimony whereof, I affix my signature, in presence of two witnesses.

JOHN WOOD.

Witnesses:
H. M. CARPENTER,
H. S. RICHARDSON.